United States Patent
Sciarra

(10) Patent No.: US 6,970,090 B1
(45) Date of Patent: Nov. 29, 2005

(54) PET TRACKING COLLAR

(76) Inventor: Michael Sciarra, 480 Joan Dr., Fairfield, CT (US) 06824

( * ) Notice: Subject to any disclaimer, the term of this patent is extended or adjusted under 35 U.S.C. 154(b) by 0 days.

(21) Appl. No.: 10/644,360

(22) Filed: Aug. 20, 2003

(51) Int. Cl.[7] .................. G08B 1/08; G08B 23/00; H04Q 7/00; F21L 15/08; A01K 27/00
(52) U.S. Cl. ................. 340/573.1; 340/539.1; 340/539.15; 340/573.3; 340/691.1; 362/103; 362/104; 362/108; 362/565; 362/570; 362/571; 119/106; 119/109; 119/795; 119/858; 119/859
(58) Field of Search ............. 340/573.1, 573.3, 340/539.1, 539.11, 691.1; 362/103–108, 362/565–571; 119/106–109, 795–859

(56) References Cited

U.S. PATENT DOCUMENTS

| | | | | |
|---|---|---|---|---|
| 5,046,456 A | * | 9/1991 | Heyman et al. | 119/859 |
| 5,074,251 A | * | 12/1991 | Pennock | 119/859 |
| 5,523,927 A | * | 6/1996 | Gokey | 362/103 |
| 5,535,106 A | * | 7/1996 | Tangen | 362/108 |
| 5,603,094 A | * | 2/1997 | Greear, Jr. | 455/66.1 |
| 5,900,818 A | * | 5/1999 | Lemnell | 340/573.3 |
| 5,952,925 A | * | 9/1999 | Secker | 340/573.2 |
| 6,067,018 A | * | 5/2000 | Skelton et al. | 340/573.3 |
| 6,557,498 B1 | * | 5/2003 | Smierciak et al. | 119/858 |

* cited by examiner

Primary Examiner—Jeffery Hofsass
Assistant Examiner—Lam Pham
(74) Attorney, Agent, or Firm—DeLio & Peterson, LLC; Peter W. Peterson

(57) ABSTRACT

A pet tracking collar comprises a length of clear flexible tubing having a fastener adapted to fasten around the pet. Hermetically sealed within the tubing is an electrical ribbon cable extending through the length thereof. A plurality of light-emitting diodes, visible through the clear tubing, are wirelessly connected at spaced intervals to the cable. The tracking collar also includes an antenna within the electrical ribbon cable, and a radio transmitter secured to the cable adapted to transmit a radio frequency signal. The cable is secured within the flexible tubing such that strain along the length of the tubing is not transmitted to the cable therein. The collar's battery compartment has sufficient clearance between the battery and walls of the battery compartment to shed water after the collar is wetted. A radio frequency signal receiver determines direction or distance of the collar with respect to the receiver.

22 Claims, 6 Drawing Sheets

PET TRACKING COLLAR

BACKGROUND OF THE INVENTION

1. Field of the Invention

The present invention relates to tracking devices and, in particular, to a pet collar that incorporates both light and radio tracking capabilities.

2. Description of Related Art

Previous attempts to provide lighted pet collars generally have fallen into three categories. In one category, there have been collars that have several light emitting diodes (LED) placed around the collar, and those LEDs have been traditional wide dispersion diodes which spread the energy over 140° or more and typically have only a 100–120 mcd brightness level. In another category, there have been collars that have employed a pendant-type of tag, i.e., one that lights up and hangs from the collar, but is not part of the collar itself. In a third category, there have been collars that use electro-luminescent displays that are sewn or otherwise attached to the collar.

Previous attempts at constructing these types of collars suffer from generally poor lighting, a large power drain (which requires large batteries and/or frequent battery replacement), and an inability to withstand constant motion and strain, which can break the wires utilized in their construction leading to rapid failure of the lighting feature. Further, attempts at sealing the electronic circuit, battery and exposed portion of the LED lights have led to rapid failures. This failure mode was caused because at least one end, LED light protrusions to the exterior of the collar, and wired battery connections were exposed and opened to the environment, which led to rapid corrosion and deterioration. Products of this nature tend to have very brief life spans, and these failure modalities have not been adequately addressed.

SUMMARY OF THE INVENTION

Bearing in mind the problems and deficiencies of the prior art, it is therefore an object of the present invention to provide a system for visual tracking of a pet.

It is another object of the present invention to provide a system for lighting a pet collar that has improved visibility.

A further object of the invention is to provide a pet tracking system that further locates the pet by distance and/or direction.

It is yet another object of the present invention to provide a pet tracking system that is durable and that has an enhanced life span.

The above and other objects, which will be apparent to those skilled in art, are achieved in the present invention, which is directed to an animal collar comprising a length of flexible tubing having a fastener adapted to be secured around the neck of an animal, with at least a portion of the tubing being clear. The collar further includes an electrical ribbon cable extended within the tubing having therein at least two electrical conductors. The cable also has, at spaced intervals, a plurality of light-emitting diodes electrically connected to the conductors. The cable and diodes are hermetically sealed inside the tubing and the light-emitting diodes are visible through the clear portion of the tubing. The collar also includes a battery attached to the tubing and electrically connected to conductors in the ribbon cable for powering the light-emitting diodes, and a switch attached to the tubing for electrically connecting and disconnecting the battery from the light-emitting diodes.

Preferably, the light-emitting diodes are connected directly to the conductors in the ribbon cable, and each have a field of view of less than about 60°. A sufficient number of diodes may be positioned on the cable so that at least two diodes are always visible to an observer. The cable may be secured within the flexible tubing such that strain along the length of the tubing is not transmitted to the cable therein. The collar preferably includes a battery compartment having sufficient clearance between the battery and walls of the battery compartment to shed water after the collar is wetted.

The animal collar may further include an antenna and a radio transmitter secured to the band adapted to transmit a radio frequency signal through the antenna. The transmitter may be disposed in the tubing and the antenna may be printed on the ribbon cable. There may also be supplied a radio frequency signal receiver adapted to determine direction or distance of the collar with respect to the receiver.

In another aspect, the present invention provides a tracking collar comprising a band having a fastener adapted to fasten to a movable object, an electrical ribbon cable extending along the band, an antenna within the electrical ribbon cable, a radio transmitter secured to the band adapted to transmit a radio frequency signal through the antenna, and a battery attached to the collar and powering the radio transmitter.

The tracking collar may further include a plurality of light-emitting diodes connected directly to conductors in the ribbon cable. The light-emitting diodes preferably each have a field of view of less than about 60°, and a sufficient number of diodes may be positioned on the cable so that at least two diodes are visible to an observer.

More preferably, the tracking collar is for a pet and the band is a length of tubing having a fastener adapted to be secured around the neck of a pet, with at least a portion of the tubing being clear, and the electrical ribbon cable extending through a length of the tubing. The cable and diodes may be hermetically sealed inside the tubing and the light-emitting diodes may be visible through the clear portion of the tubing. Preferably, the cable is secured within the flexible tubing such that strain along the length of the tubing is not transmitted to the cable therein. The transmitter may also be disposed in the tubing and the antenna may be printed on the ribbon cable.

The tracking may further include a battery compartment for holding a battery for powering the transmitter, with the battery compartment having sufficient clearance between the battery and walls of the battery compartment to shed water after the collar is wetted.

In a further aspect, the present invention provides a tracking system comprising a collar having a band with a fastener adapted to fasten to a movable object, an electrical ribbon cable extending along the band, an antenna within the electrical ribbon cable, a radio transmitter secured to the cable adapted to transmit a radio frequency signal through the antenna, and a battery attached to the collar and powering the radio transmitter. The tracking system also includes a radio frequency signal receiver adapted to determine direction or distance of the collar with respect to the receiver.

The radio frequency signal receiver may include at least one directional antenna to determine the relative direction of the radio frequency signal from the transmitter. The radio frequency signal receiver may also include, either with or without the directional antenna, an alarm to signal when a radio frequency signal from the transmitter decreases below a predetermined strength. Preferably, the radio frequency signal receiver includes a signal attenuator adapted to automatically adjust gain as the transmitter approaches the receiver to prevent overloading of the receiver.

In yet another aspect, the present invention provides a tracking collar comprising a band having a fastener adapted to fasten to a movable object, an electrical ribbon cable extending along the band and having therein a plurality of electrical conductors extending substantially the entire distance of the cable, and a plurality of light-emitting diodes connected at spaced intervals to the electrical ribbon cable and receiving electrical power from at least two electrical conductors therein. The tracking collar also includes an antenna within the electrical ribbon cable, a radio transmitter secured to the band adapted to transmit a radio frequency signal through the antenna, and a battery attached to the band and powering the light-emitting diodes and radio transmitter.

In the preferred embodiment, the antenna and electrical conductors providing power to the light-emitting diodes are printed on the ribbon cable. More preferably, the collar is a pet collar and the band is a length of clear flexible tubing having a fastener adapted to be secured around the neck of a pet, with the electrical ribbon cable extending through a length of the tubing. The cable and diodes may be hermetically sealed inside the tubing and the light-emitting diodes may be visible through the clear portion of the tubing. The cable may be secured within the flexible tubing such that strain along the length of the tubing is not transmitted to the cable therein. The tracking collar may further include a battery compartment having sufficient clearance between the battery and walls of the battery compartment to shed water after the collar is wetted.

The tracking collar may also include a radio frequency signal receiver adapted to determine direction or distance of the collar with respect to the receiver.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1–13 of the drawings in which like numerals refer to like features of the invention.

Figure 1:
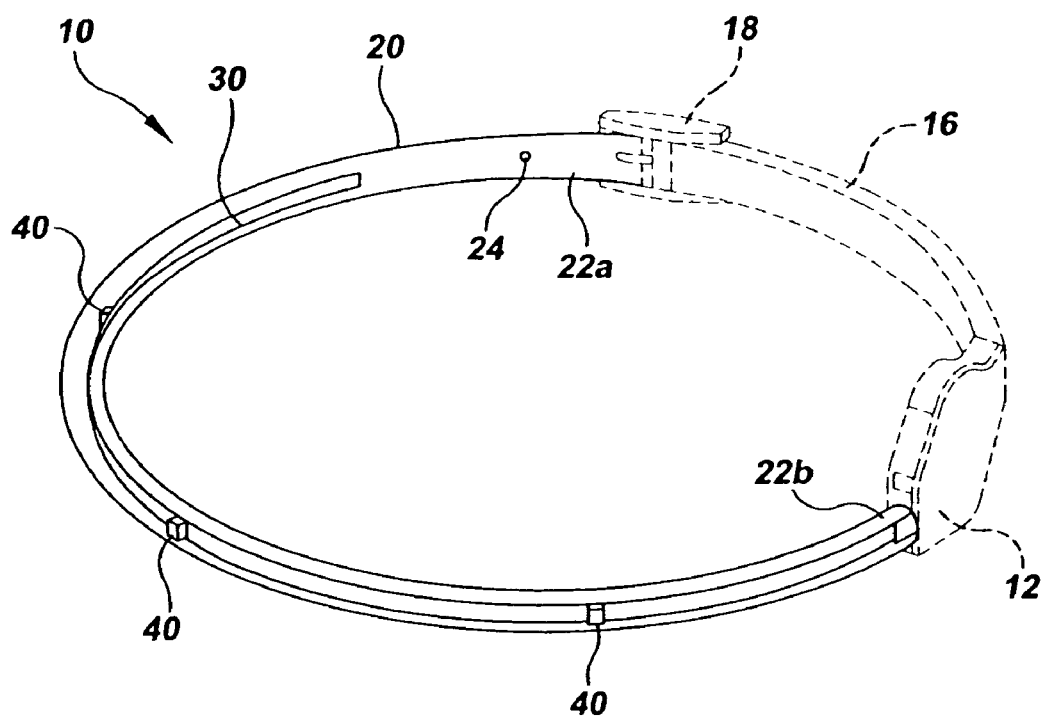
FIG. 1 is a perspective view of the preferred pet tracking collar of the present invention in a fastened position, with the battery housing and fastening strap in phantom lines.
Figure 2:
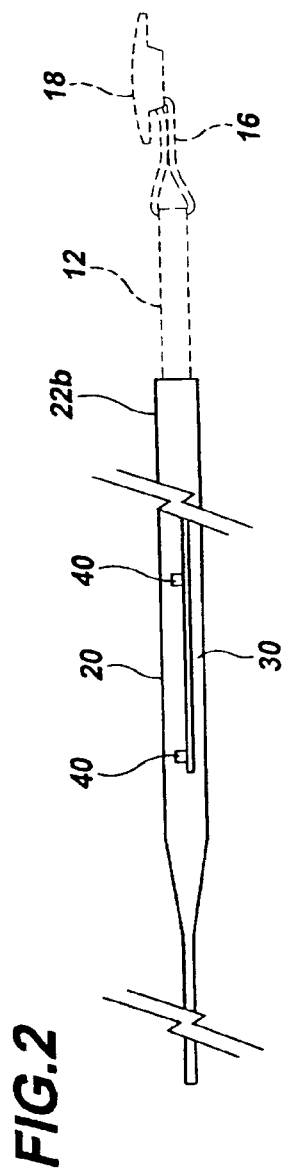
FIG. 2 is a side elevational view of the pet tracking collar of FIG. 1, in an unfastened position.
Figure 3:
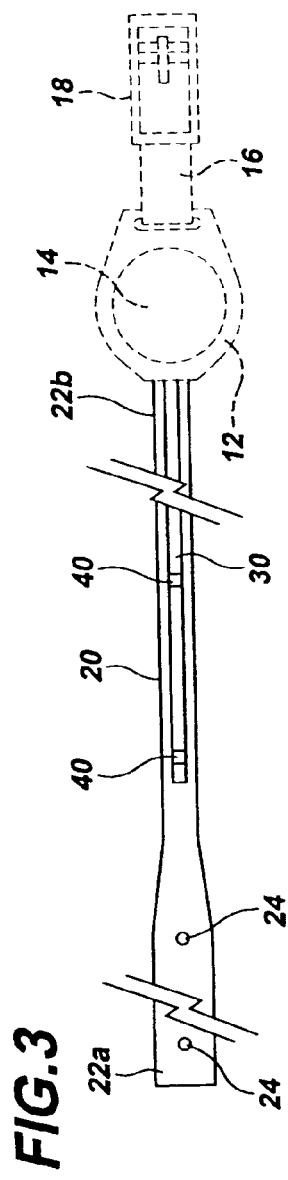
FIG. 3 is a top plan view of the pet tracking collar of FIG. 1, in an unfastened position.
Figure 4:
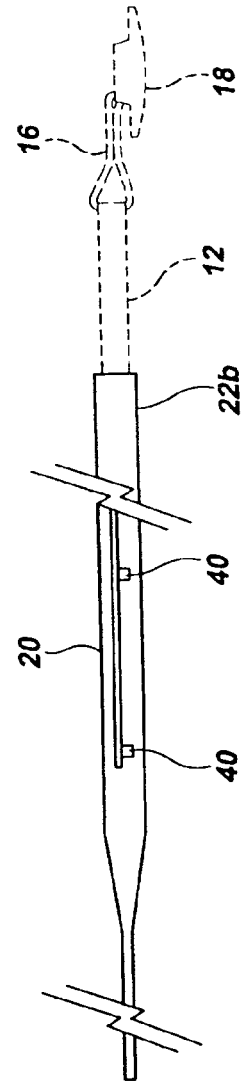
FIG. 4 is an opposite side elevational view of the pet tracking collar of FIG. 1, in an unfastened position.
Figure 5:
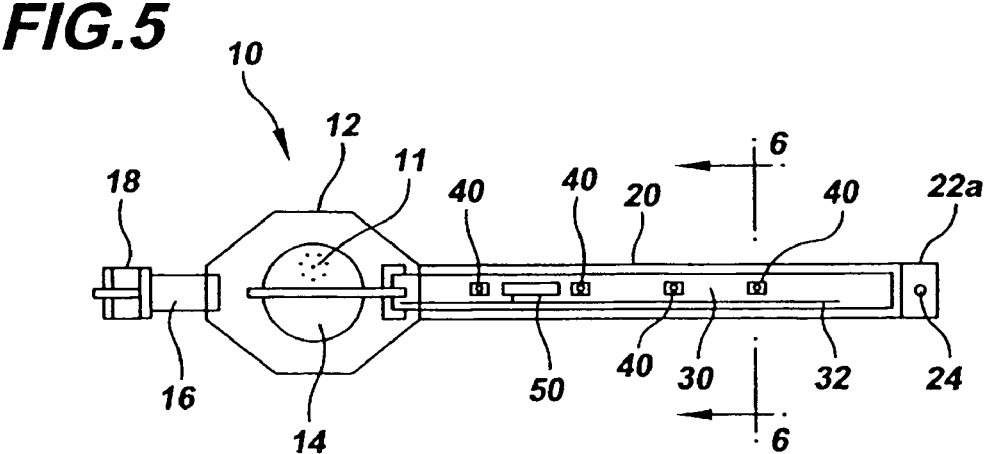
FIG. 5 is a top plan view of the preferred pet tracking collar of FIG. 1, in an unfastened position.
Figure 6:
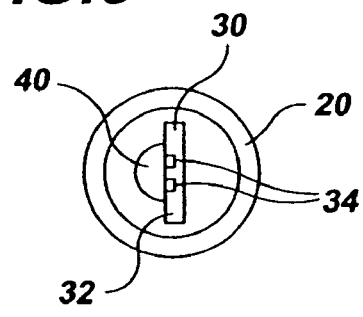
FIG. 6 is a cross sectional view of the pet tracking collar of FIG. 5, along lines 6—6, showing the LED and antenna printed on the cable.

This invention is directed to a lighted pet tracking collar that operates on a watch-type battery to render animals visible during the night that further incorporates an AM, FM, UHF or other wireless transmitter configured so as to enable location of a lost or out of sight animal through the use of a small direction-indicating handheld receiver. The preferred embodiment of the pet tracking collar 10 is depicted in FIGS. 1–11, and includes a battery housing 12 having attached on one end a flexible nylon strap 16 and buckle 18, and on the opposite end a flexible clear plastic tubing 20 having a compressed and heat-sealed free end 22a with an opening 24 for engagement with the buckle tab. Membrane switch 11 on the back of housing 12 (FIGS. 5 and 11) is connected to the microprocessor and is selectable between on and off positions to control the power to the collar components. Suspended within tubing 20 is a flexible ribbon cable or circuit substrate 30 made of plastic, such as Kapton brand polyimide film available from DuPont, or other dielectric and having printed thereon conductors running substantially the entire length of the circuit substrate and electrically connected to battery 14 when switch 11 is turned on. The invention includes surface mount components comprising a plurality of spaced light-emitting diodes (LEDs) and a microprocessor 50 which also includes a radio frequency transmitter. These surface mount components are leadless, i.e., without connecting wires, and attach directly to the conductors at the surface of flexible substrate 30 by soldering or other means. In FIG. 2 there is shown LED 40 electrically connected to conductors 34 in circuit substrate 30. Also printed on flexible substrate 30 is an antenna 32 extending along substantially the length of the circuit substrate and connected to microprocessor/transmitter 50, as shown in FIGS. 5 and 6.

Figure 12:
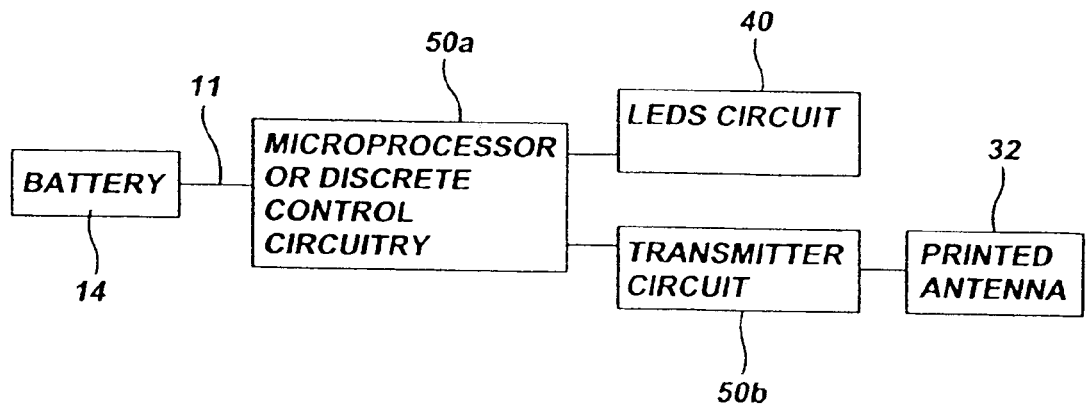
FIG. 12 is a schematic showing the LED and radio frequency transmitter control circuitry.

In the schematic shown in FIG. 12, microprocessor 50a, powered by battery 14, controls both the LEDs 40 and the transmitter circuit 50b connected to antenna 32. In the transmitter circuitry, the input/output to microprocessor 50a includes on/off digital switch 11, and the modulation output to the transmitter 50b. Operational frequencies may be any that are in the ISM bands allowed by the FCC, and typically 315, 433, and 916.5 MHz. may be utilized. Amplitude modulation (AM) may be either On/Off keyed (OOK) or amplitude shift keyed (ASK). Frequency modulation (FM) may also be utilized with an appropriate FM receiver.

To carry the entire LED string and other circuitry, tubing 20 is preferably a polyvinyl tubing that is sealed at both ends and provides a very inexpensive yet strong carrier vehicle for the electronics while at the same time providing a watertight, hermetically sealed enclosure. Tubing 20 is clear in at least the portions adjacent LEDs 40, and is preferably entirely clear. Circuit substrate 30 and the circuitry thereon are attached at only one end to battery housing 12 and, as shown in FIG. 2, are consequently safely suspended inside tubing 20. As a result, the circuitry never undergoes the strain associated with normal animal movement or the extreme strain associated with controlling a larger animal on a leash.

Figure 7:
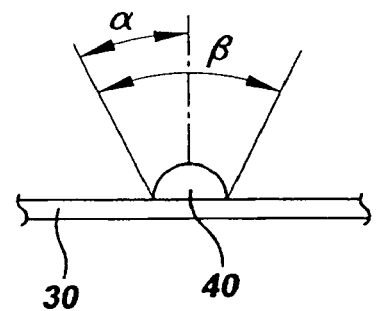
FIG. 7 is a top plan view of the LED of FIG. 6, showing the field of view.

This invention preferably utilizes narrowly focused LEDs to provide bright lighting. More preferably, the tracking collar utilizes four or more high intensity surface mount visible blue-white diodes, approximately evenly spaced around the collar, with narrow beam widths of less than 60 degrees, most preferably 50 degrees or less. As depicted in FIG. 7, the field of view β has beam limits of angle α around a line perpendicular to circuit substrate 30. These diodes may be precisely aligned around a predetermined arch and preferably will always be on the same plane relative to the viewer. That is, if the viewer can see one diode, he will also see one or more additional LEDs. The energy thus concentrated is seen at over 1000 mcd (millicandellas) brightness per diode.

Figure 8:
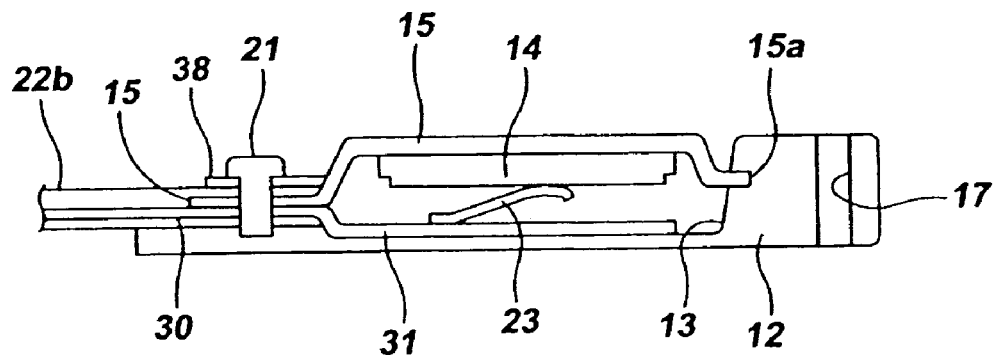
FIG. 8 is a side elevational view, in cross section, of a portion of the pet tracking collar of FIG. 5, showing the battery housing.
Figure 9:
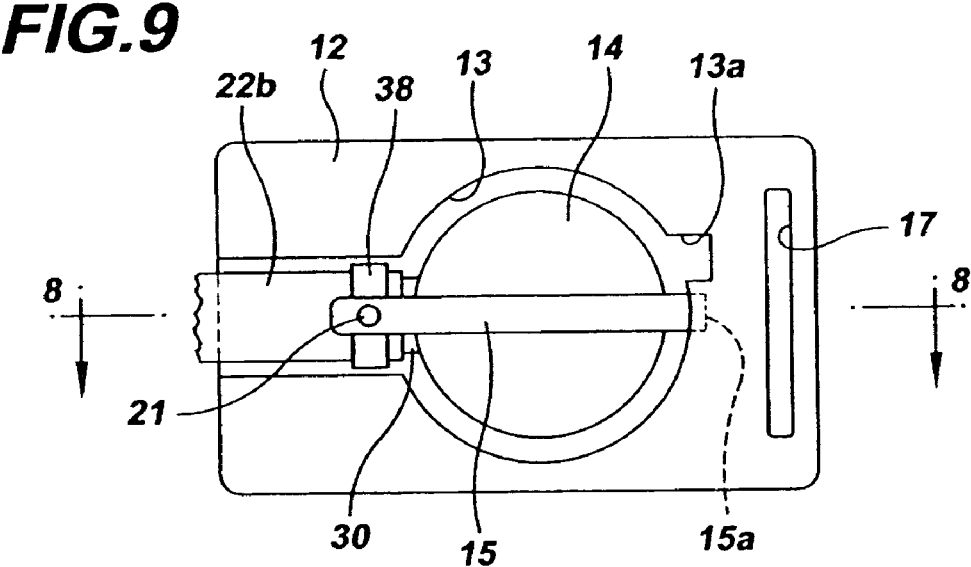
FIG. 9 is a top plan view of the battery housing of FIG. 8.

As shown in FIGS. 8 and 9, battery housing 12 is configured to provide air passages and rapid drying should the collar be immersed in water or become wet. Molded plastic housing 12, has opening 17 for attachment to strap 16 and a fastener 21 and transverse bar member 38 for securing and sealing circuit substrate 30 within compressed free end 22b of tubing 20 (FIG. 1). Housing 12 further has an open back for receiving battery 14 and an inner periphery 13 spaced from and larger than the outer periphery of the battery. This overcomes the rapid circuit corrosion and chemical leakage damage that occurs when water is trapped between the negative and positive sides of a battery. Battery 14 is disposed above spring biased tab 23, electrically connected to one battery terminal, and below spring biased tab 15, electrically connected to the other battery terminal. The open back enables quick battery changing, by simply sliding battery tab 15 to the open position, by pivoting around fastener 21, until the free end 15a reaches open housing notch 13a, and raising the tab. The low power usage of the LED and transmitter circuits permits the use of watch type batteries having energy storage less than 180 milliamp hours.

Figure 10:
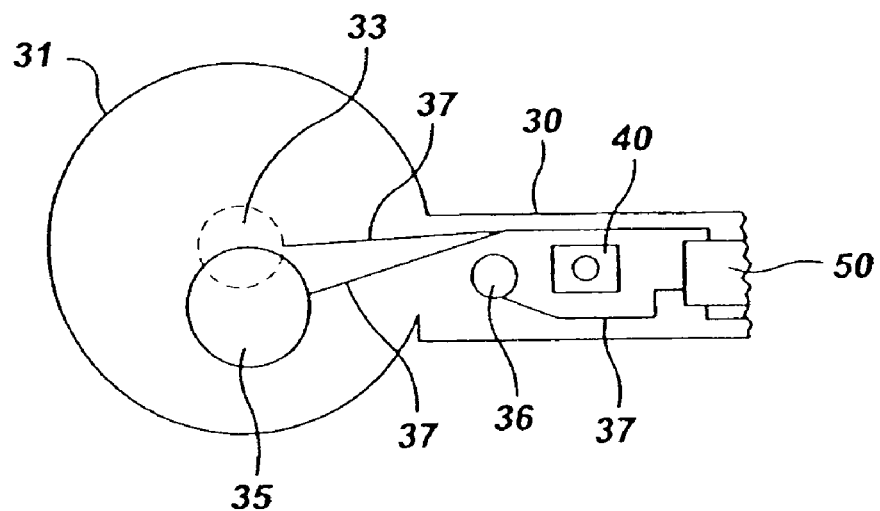
FIG. 10 is a top plan view of the end of the flexible cable substrate that connects within the battery housing of FIGS. 8 and 9.

The connection of the flexible circuit substrate to the battery housing is shown in FIGS. 8 and 10. As shown in FIG. 10, circuit substrate 30 has flared end 31 which contains on one side a connector 33 for electrical connection to the membrane switch 11 (FIG. 5), and on the other side a connector 35 for connection to battery spring tab 23 (FIG. 8) and the negative battery terminal. Connector 36 extends around the opening in tube end 22b through which rivet fastener 21 extends (FIGS. 8 and 9) and electrically connects to battery tab 15 and the positive battery terminal. Conductors 37 within flexible circuit substrate 30 electrically connect these connectors 33, 35, 36 to microprocessor/transmitter 50.

Figure 11:
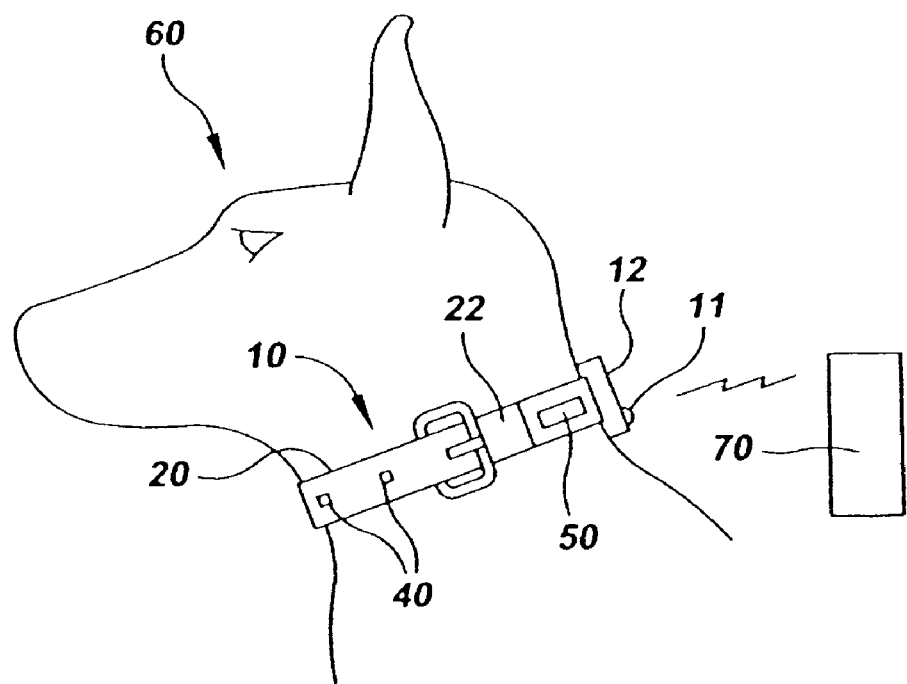
FIG. 11 is a side view of the pet tracking collar of FIG. 5, fastened around the neck of a dog, along with the radio frequency signal receiver to determine direction or distance of the collar.
Figure 13:
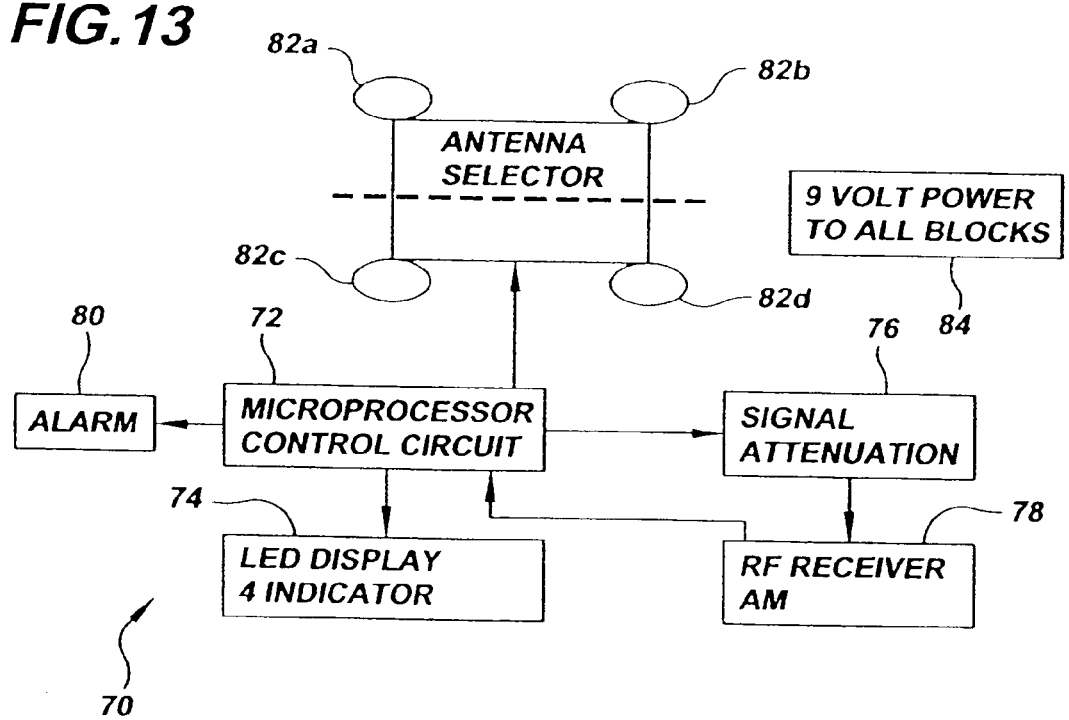
FIG. 13 is a schematic showing the control circuitry of the radio frequency signal receiver of FIG. 9.

Collar 10 is shown affixed to animal 60 in FIG. 11, around the animal's neck. To provide a means by which an animal may be located should it wander away out of sight of its owner, there is provided a radio frequency receiver 70 which picks up the signal emitted by transmitter 50. Turning to FIG. 13, receiver 70 includes a battery 84 powering a microprocessor control circuit 72 connected to a radio frequency receiver 70 and a signal attenuator 76. Using otherwise well known systems and methods, multiple antennas 82a, 82b, 82c, 82d each have distinct receiving patterns are shown separated in space to determine the direction of the animal wearing the tracking collar. A single directional antenna may be simply rotated until the strongest signal is received. Other antennas of the type employed in AM radios or LORAN navigation systems which rely on the directionality of ferrite coil antennas may be used for locating the direction of a transmitter. In using separate directional antennas 82a–d, the antenna closest to the source will receive the stronger of the signals from the transmitter location. After processing the received signals for signal strength, microprocessor 72 provides direction information to the user through an LED display 74 comprised of four LEDs, each corresponding to one of the antennas. To reduce the size, complexity, and cost of the direction finding receiver, the components of receiver 70 may be printed or otherwise attached onto a printed circuit board and use electronic switching techniques. By measuring the relative received strength of one antenna at any specific moment, microprocessor 72 determines which has the strongest signal and displays the proper LED 74. In the event that the animal has strayed beyond the receiver's range, the owner may activate the receiver and walk or drive around a neighborhood until the signal is picked up, and then locate the animal using the directional LED indications on the receiver.

The tracking feature of the present invention also permits notification if the animal has exceeded a selected area of protection. This is accomplished by programming the receiver microprocessor so that, when the transmitter in the animal collar has traveled beyond a predetermined distance from the receiver and the receiver no longer detects the transmissions emanating from the collar, or when the signal falls below a predetermined signal strength, tracking receiver 70 may provide an alert by way of an audible or visual alarm 80.

In either tracking mode, as the receiver gets closer to the transmitter source in the collar, a signal attenuating circuit 76 automatically adjusts the unit's gain in such a way as all antennas will still receive a signal but that signal will be attenuated so as not to cause overloading of the receiver. This overloading prevents more than one antenna from presenting the same signal strength and compromising the directional ability of the system in strong signal environments.

In addition to use with animals, the tracking collar of the present invention, particularly the directional and distance tracking feature, may be used to track anything else that moves, such as humans or objects.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An animal collar comprising:
   a length of flexible tubing having a fastener adapted to be secured around the neck of an animal, at least a portion of the tubing being clear;
   an electrical ribbon cable extended within the tubing having therein at least two electrical conductors, the cable further having thereon, at spaced intervals, a plurality of light-emitting diodes electrically connected to the conductors, the cable and diodes being hermetically sealed inside the tubing and the light-emitting diodes being visible through the clear portion of the tubing;
a battery attached to the tubing and electrically connected to conductors in the ribbon cable for powering the light-emitting diodes;
a switch attached to the tubing for electrically connecting and disconnecting the battery from the light-emitting diodes; and
an antenna and a radio transmitter secured to the band adapted to transmit a radio frequency signal through the antenna, wherein the transmitter is disposed in the tubing and the antenna is printed on the ribbon cable.

2. The animal collar of claim 1 wherein the light-emitting diodes are connected directly to the conductors in the ribbon cable.

3. The animal collar of claim 1 wherein the light-emitting diodes each have a field of view of less than about 60°, and wherein a sufficient number of diodes are positioned on the cable so that at least two diodes are visible to an observer.

4. The animal collar of claim 1 wherein the cable is secured within the flexible tubing such that strain along the length of the tubing is not transmitted to the cable therein.

5. The animal collar of claim 1 further including a battery compartment for holding the battery, the battery compartment having sufficient clearance between the battery and walls of the battery compartment to shed water after the collar is wetted.

6. The animal collar of claim 1 further including a radio frequency signal receiver adapted to determine direction or distance of the collar with respect to the receiver.

7. A tracking collar comprising:
a band having a fastener adapted to fasten to a movable object;
an electrical ribbon cable extending along the band;
an antenna within the electrical ribbon cable;
a radio transmitter secured to the band adapted to transmit a radio frequency signal through the antenna; and
a battery attached to the collar and powering the radio transmitter.

8. The tracking collar of claim 7 further including a plurality of light-emitting diodes connected directly to conductors in the ribbon cable, the light-emitting diodes each having a field of view of less than about 60°, and wherein a sufficient number of diodes are positioned on the cable so that at least two diodes are visible to an observer.

9. The tracking collar of claim 7 wherein the collar is a pet collar and the band is a length of tubing having a fastener adapted to be secured around the neck of a pet, at least a portion of the tubing being clear, the electrical ribbon cable extending through a length of the tubing.

10. The tracking collar of claim 9 wherein the cable and diodes are hermetically sealed inside the tubing and the light-emitting diodes being visible through the clear portion of the tubing and wherein the cable is secured within the flexible tubing such that strain along the length of the tubing is not transmitted to the cable therein.

11. The tracking collar of claim 9 wherein the transmitter is disposed in the tubing and the antenna is printed on the ribbon cable.

12. The tracking collar of claim 7 wherein the collar further includes a battery compartment for holding a battery for powering the transmitter, the battery compartment having sufficient clearance between the battery and walls of the battery compartment to shed water after the collar is wetted.

13. A tracking system comprising:
a collar having a band with a fastener adapted to fasten to a movable object, an electrical ribbon cable extending along the band, an antenna within the electrical ribbon cable, a radio transmitter secured to the cable adapted to transmit a radio frequency signal through the antenna, and a battery attached to the collar and powering the radio transmitter; and
a radio frequency signal receiver adapted to determine direction or distance of the collar with respect to the receiver.

14. The tracking system of claim 13 wherein the radio frequency signal receiver includes at least one directional antenna to determine the relative direction of the radio frequency signal from the transmitter.

15. The tracking system of claim 13 wherein the radio frequency signal receiver includes an alarm to signal when a radio frequency signal from the transmitter decreases below a predetermined strength.

16. The tracking system of claim 13 wherein the radio frequency signal receiver includes a signal attenuator adapted to automatically adjust gain as the transmitter approaches the receiver to prevent overloading of the receiver.

17. A tracking collar comprising:
a band having a fastener adapted to fasten to a movable object;
an electrical ribbon cable extending along the band and having therein a plurality of electrical conductors extending substantially the entire distance of the cable;
a plurality of light-emitting diodes connected at spaced intervals to the electrical ribbon cable and receiving electrical power from at least two electrical conductors therein;
an antenna within the electrical ribbon cable;
a radio transmitter secured to the band adapted to transmit a radio frequency signal through the antenna; and
a battery attached to the band and powering the light-emitting diodes and radio transmitter.

18. The tracking collar of claim 17 wherein the antenna and electrical conductors providing power to the light-emitting diodes are printed on the ribbon cable.

19. The tracking collar of claim 17 wherein the collar is a pet collar and the band is a length of clear flexible tubing having a fastener adapted to be secured around the neck of a pet, the electrical ribbon cable extending through a length of the tubing.

20. The tracking collar of claim 19 wherein the cable and diodes are hermetically sealed inside the tubing and the light-emitting diodes being visible through the clear portion of the tubing and wherein the cable is secured within the flexible tubing such that strain along the length of the tubing is not transmitted to the cable therein.

21. The tracking collar of claim 19 further including a battery compartment for holding the battery, the battery compartment having sufficient clearance between the battery and walls of the battery compartment to shed water after the collar is wetted.

22. The tracking collar of claim 17 further including a radio frequency signal receiver adapted to determine direction or distance of the collar with respect to the receiver.

\* \* \* \* \*